(12) United States Patent
Simonis et al.

(10) Patent No.: US 12,442,868 B2
(45) Date of Patent: Oct. 14, 2025

(54) METHOD AND APPARATUS FOR DIAGNOSING VOLTAGE SENSORS OF A DEVICE BATTERY HAVING A PLURALITY OF BATTERY CELLS

(71) Applicant: Robert Bosch GmbH, Stuttgart (DE)

(72) Inventors: Christian Simonis, Leonberg (DE); Christoph Woll, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 18/363,492

(22) Filed: Aug. 1, 2023

(65) Prior Publication Data
US 2024/0044997 A1 Feb. 8, 2024

(30) Foreign Application Priority Data
Aug. 2, 2022 (DE) ...................... 10 2022 207 963.9

(51) Int. Cl.
*G01R 31/396* (2019.01)
*G01R 31/367* (2019.01)
*G01R 31/3835* (2019.01)

(52) U.S. Cl.
CPC ......... *G01R 31/396* (2019.01); *G01R 31/367* (2019.01); *G01R 31/3835* (2019.01)

(58) Field of Classification Search
CPC . G01R 31/396; G01R 31/3835; G01R 31/367
See application file for complete search history.

(56) References Cited

U.S. PATENT DOCUMENTS

| | | | | |
|---|---|---|---|---|
| 6,928,854 B2* | 8/2005 | Hartz | ................... | F02D 41/222 73/1.16 |
| 9,921,270 B2* | 3/2018 | Butzmann | ........... | H01M 10/482 |

FOREIGN PATENT DOCUMENTS

| | | |
|---|---|---|
| DE | 102020109133 A1 | 10/2020 |
| DE | 102020133934 A1 | 6/2022 |

* cited by examiner

*Primary Examiner* — Walter L Lindsay, Jr.
*Assistant Examiner* — Milton Gonzalez
(74) *Attorney, Agent, or Firm* — Michael Best & Friedrich LLP

(57) ABSTRACT

A method for monitoring cell voltage sensors (31) of a battery system (1) comprising a device battery (2) having a plurality of battery cells (21), comprising the following steps:
 continuous monitoring (Si) of the device battery (2) to detect a faulty cell voltage sensor (31) with a voltage offset above a predetermined threshold;
 upon detecting a faulty cell voltage sensor (31) (S2), detecting a plurality of voltage offsets at a plurality of evaluation time points;
 creation of (S4, S5, S6) a sensor drift model based on the multiple voltage offsets to determine or predict a voltage offset depending on the calendrical age of the device battery (2); wherein the voltage offset of a faulty cell voltage sensor (31) is detected by a deviation from a reference cell voltage, wherein the reference cell voltage is determined depending on the sensor drift model.

9 Claims, 2 Drawing Sheets

METHOD AND APPARATUS FOR DIAGNOSING VOLTAGE SENSORS OF A DEVICE BATTERY HAVING A PLURALITY OF BATTERY CELLS

BACKGROUND

The invention relates to portable batteries with a plurality of battery cells, which are monitored with respect to their cell voltages for functional diagnosis with the aid of a monitoring unit. The invention further relates to a method for detecting sensor errors of voltage sensors for measuring cell voltage and battery voltage.

Device batteries for energy-intensive applications in technical equipment, such as vehicle batteries for electric vehicles, usually have a plurality of interconnected battery cells to provide the total power. With the aid of a battery management system, the battery cells and the terminal voltage of the device battery are monitored for faults. However, the voltage sensors used for this purpose can themselves exhibit errors and, in particular, be subject to voltage sensor drift, in which the measured voltage increasingly deviates from the actual voltage as the voltage sensor ages.

Today's battery systems are designed to detect a voltage sensor drift only when a deviation allowed by the specification exceeds a predetermined threshold. In this case, an error bit is set, and the fault is signaled to the user or in some other way in the technical device.

One difficulty in particular is that a deviation of a measured voltage can occur due to a voltage sensor fault or due to increased aging of one of the battery cells, which also results in a lower cell voltage. While individual cell voltage sensor errors can still be detected by plausibility methods, the causes of errors can no longer be readily determined in the case of deviations of multiple cell voltages.

SUMMARY

A method of diagnosing cell voltage sensors for measuring cell voltages of battery cells in portable batteries and for determining signal drifts of cell voltage sensors is provided, and a corresponding apparatus and battery system.

According to a first aspect, there is provided a method for monitoring cell voltage sensors of a battery system including a device battery having a plurality of battery cells, comprising the steps of:
  continuous monitoring of the device battery to detect a faulty cell voltage sensor with a voltage offset above a predetermined threshold;
  upon detecting a faulty cell voltage sensor, detecting a plurality of voltage offsets at a plurality of evaluation time points;
  creation of a sensor drift model based on the multiple voltage offsets to determine or predict a voltage offset depending on the calendrical age of the device battery;
  wherein the voltage offset of a faulty cell voltage sensor is detected by a deviation from a reference cell voltage, wherein the reference cell voltage is determined depending on the sensor drift model.

In portable batteries with a plurality of battery cells, the cell voltages are measured using cell voltage sensors and a terminal voltage of the entire portable battery is measured using a total voltage sensor with the aid of a monitoring unit, a so-called CSC (Cell Supervising Circuit), and provided as digital values to a battery management system assigned to the portable battery. The battery management system is a system for monitoring, controlling and protecting batteries and performs functions such as, e.g., state of charge detection, deep discharge protection, overcharge protection, and provides a data interface with external units.

Further, detecting a faulty cell voltage sensor can include verifying that the total voltage of the device battery differs from the sum of the measured cell voltages, by the voltage offset.

If a cell voltage sensor exhibits signal drift, the cell voltage value provided is lower or higher than the actual cell voltage, wherein the separately measured terminal voltage of the device battery is independent of this. If, on the other hand, a cell voltage shows deterioration in the form of increased aging compared to the other cell voltages of the device battery, the cell voltage of the battery cell concerned is lower than the cell voltage of the other battery cells. However, the reduced cell voltage also affects the terminal voltage. Thus, when a deviation of a cell voltage is detected for the cell voltage measurements, the battery management system can clearly assign a fault as to whether a deviating cell voltage occurred due to a signal drift of the cell voltage sensor or due to increased cell aging.

While device batteries in which one or more battery cells are subject to increased aging are usually replaced, a device battery in which one or more cell voltage sensors with increased signal drift are present can continue to be used if the amount or measure of signal drift is determined and taken into account in further processing of the measured cell voltage values. Usually, the signal drift is taken into account by a simple offset to the measured cell voltage value.

As described above, battery cells with increased aging are easily distinguished from a faulty or signal drift cell voltage sensor because the resulting reduced cell voltage affects both the cell voltage and the overall terminal voltage. However, with this method it is not possible to identify the cause of the fault without any doubt in the case of multiple cell voltage sensors with excessive signal drifts. In other words, there is a problem in that if the signal drifts from more than one cell voltage sensor are not known, a clear distinction cannot be made between a cell voltage sensor fault or an increased aging of the battery cell. The above procedure now allows the determination of cell voltage sensor signal drifts when more than one cell voltage sensor has a signal drift.

According to one embodiment, the method can be executed continuously, in particular starting from the beginning of the lifetime of the device battery, to detect a further faulty cell voltage sensor after the detection of a faulty cell voltage sensor, wherein the detection of a further faulty cell voltage sensor takes into account the voltage offset of the cell voltage sensor(s) previously detected as faulty.

The method provides for determining those cell voltages that deviate from an average cell voltage of the battery cells of the device battery, i.e., the reference cell voltage, by more than a predetermined amount. The predetermined amount can be determined relative or absolute to the average of the cell voltages using an applicable threshold or one specified by the device battery specification.

It can be provided that the reference cell voltage is determined as an average value of the measured cell voltages of all or part of the battery cells, wherein the cell voltages detected by a faulty cell voltage sensor are corrected by the voltage offset resulting from the sensor drift model for the current evaluation time, wherein in particular the highest and lowest of the cell voltages are disregarded when forming the average value.

The mean value of the cell voltages can be calculated based on all cell voltages or on a portion of the cell voltages, wherein, for example, the cell voltages of the battery cell with the highest and the lowest cell voltage are ignored. If, at the beginning or during continuous monitoring, a battery cell is identified whose cell voltage deviates from the mean cell voltage by more than the applicable cell voltage threshold, an offset fault is assigned to that battery cell. The respective offset fault is used to correct the measured cell voltage in each case, so that the corrected cell voltage is available for all further functions in the battery management system.

By periodically checking the cell voltages at evaluation times in the manner described above, it is possible to detect whether the cell voltage sensor fault is purely an offset fault or a sensor drift. For example, the observation of a time series progression of a series of voltage offsets of the cell voltage measurement of the battery cell in question, according to the above procedure, crystallizes out whether it is a constant voltage offset (offset error) or a voltage offset that progresses over time (increases in amount) (sensor drift).

Thus, in the event of a sensor drift, a time series of the cell voltages of the battery cell at the corresponding evaluation times can be determined and a sensor drift model for the relevant cell voltage sensor can be determined. The sensor drift model can be data-based or by fitting a given parametric regression function, such as a polynomial function or a spline function or the like.

After identifying an offset fault or sensor drift, the appropriate voltage deviation/offset can be applied to the measured cell voltage value in each case to compensate for the corresponding error.

The sensor drift model can be formed as a data-based model and trained with the voltage offsets of the faulty cell voltage sensor, or wherein the sensor drift model is formed as a parametric regression model and is fitted with the voltage offsets of the faulty cell voltage sensor.

Due to the continuous or regular monitoring of the cell voltages of the individual battery cells, further cell voltage sensor errors can be detected, which are formed due to the sensor drift of the relevant cell voltage sensor. The ability to compensate for sensor drift by applying a correction to the cell voltage sensors allows the monitoring unit to continue to operate even if one or more cell voltage sensors have a corresponding offset or sensor drift error. The corrected cell voltage values are assumed for cell voltage sensors already detected as faulty. By predicting the sensor drift with the sensor drift model, an overshoot of a cell voltage deviation from the reference cell voltage for another cell voltage sensor not previously identified as faulty can be detected at any later evaluation time, taking into account the previously determined sensor drift history and the prediction of the sensor drift of the cell voltage sensors previously identified as faulty.

When evaluating multiple evaluation times, cell voltage sensor errors can be identified for the further cell voltage sensor if a corresponding development of the corresponding cell voltage differences has been recorded for multiple evaluation points, in order to determine a prediction model for the cell voltage offsets, i.e., for the sensor drift. Subsequent cell voltage sensor errors can then be detected by exceeding the specified cell voltage difference threshold and analyzed accordingly in terms of their trend at subsequent evaluation times.

Thus, the above procedure allows the device battery to continue to operate even when the cell voltage deviation threshold for multiple cell voltage sensors is exceeded, i.e., when the sensor specification limit is reached or exceeded. Since in particular the time of termination of charging and discharging of the device battery is determined voltage-dependently, it can be avoided that the battery charging or discharging is terminated prematurely by the battery management system. Furthermore, the correction of the detected voltage offsets enables balancing of the battery cells to be carried out even in the presence of sensor drift of a respective cell voltage sensor, without the balancing resulting in an erroneously excessive energy drain from one of the battery cells.

BRIEF DESCRIPTION OF THE DRAWINGS

Embodiments are explained in more detail below with reference to the accompanying drawings. The following are shown.

DETAILED DESCRIPTION

Figure 1:
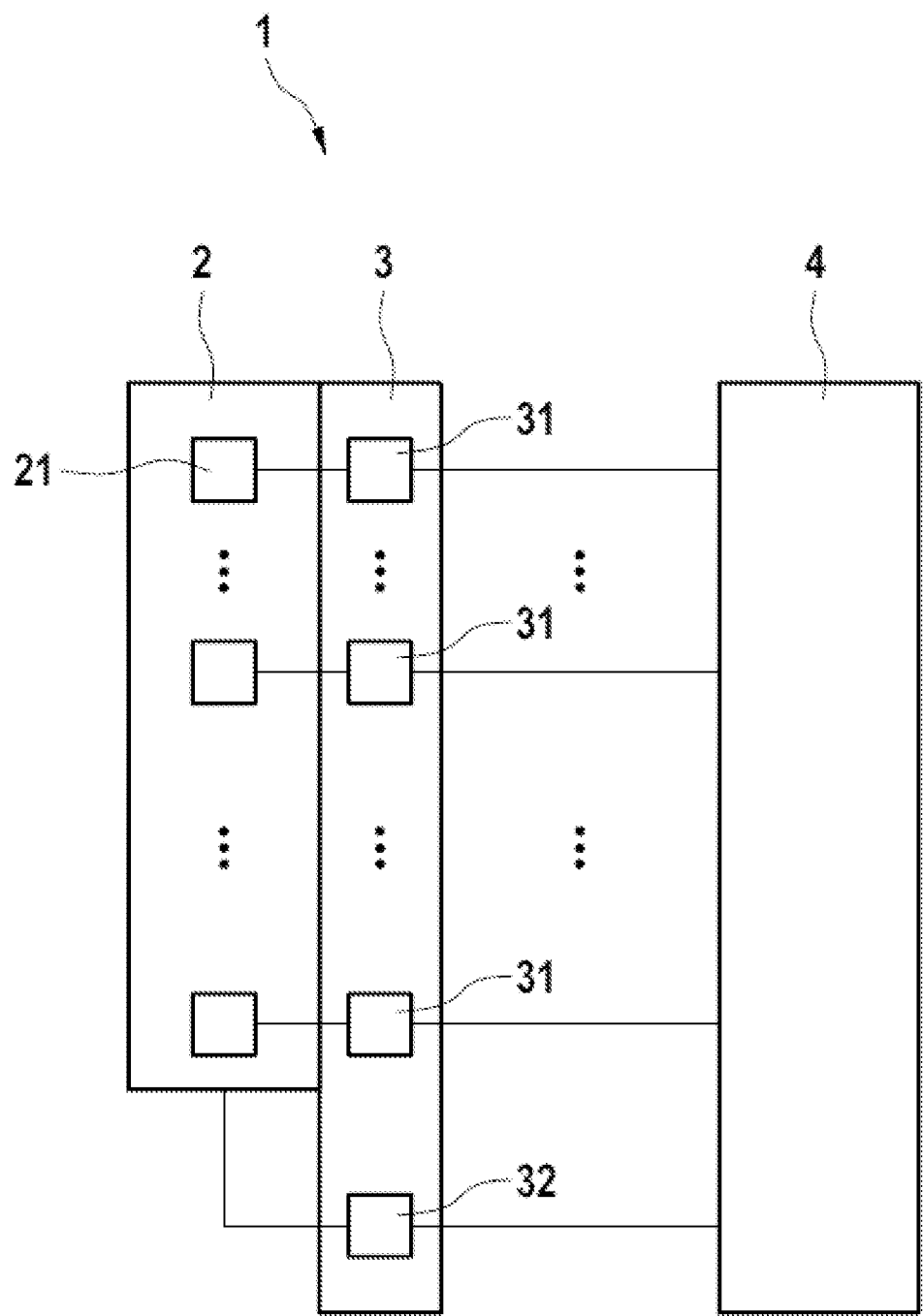
FIG. 1 a schematic representation of a device battery with a plurality of battery cells of a monitoring unit in a battery management system.

FIG. 1 shows a schematic diagram of a battery system 1 including a device battery 2 having a battery pack with a plurality of interconnected battery cells 21. A monitoring unit 3 is provided for voltage monitoring, which comprises cell voltage sensors 31 each for measuring a cell voltage of individual battery cells 21 and a terminal voltage sensor 32 for measuring the terminal voltage of the device battery 2. The voltage values are measured, digitized and passed on to a battery management system 4 for evaluation.

With the help of the battery management system 4, the measured cell voltages and the terminal voltage are plausibilized and used to detect and compensate for voltage sensor errors. In particular, the method described below is carried out in the battery management system 4.

Figure 2:
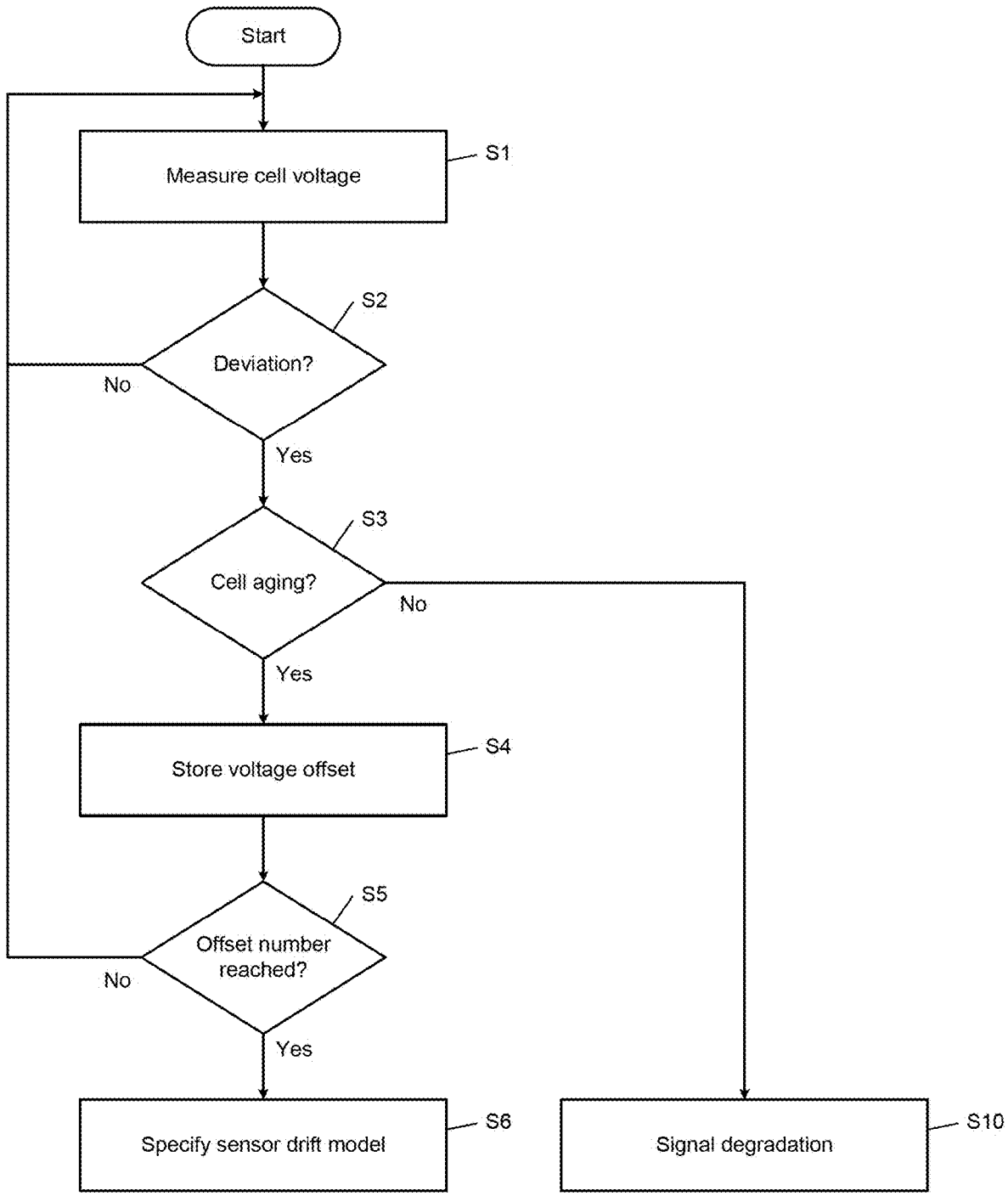
FIG. 2 a flowchart illustrating a method for determining cell voltage sensor errors.

FIG. 2 shows a method for monitoring cell voltage sensors 31. The method is implemented as an algorithm in software and/or as hardware in the battery management system 4.

In step S1, the cell voltages are first measured with the aid of the cell voltage sensors 31 and the terminal voltage with the aid of the terminal voltage sensor 32, digitized and provided to the battery management system 4 as digital voltage values, i.e., as cell voltages and as terminal voltage.

Subsequently, in step S2, it is checked whether there is a deviation of one of the cell voltages (measured value of the actual cell voltage). This is done by comparing the highest and lowest cell voltages against an average of cell voltages corresponding to a reference cell voltage. The mean value of the cell voltage can take into account all cell voltages or all cell voltages except the cell voltage of the battery cells with the highest and the lowest cell voltage.

If the highest and/or the lowest cell voltage deviates from the reference cell voltage by more than a predefined threshold value (alternative: Yes), a fault can be concluded and the procedure continues with step S3. Otherwise (alternative: No), a jump back to step S1 occurs.

In step S3, the sum of the measured cell voltages or, in the case that one or more of the cell voltages must be corrected with respect to a voltage offset or sensor drift, the sum of the cell voltages is determined taking into account the corrected cell voltages and this is compared with the measured terminal voltage. Thus, a plausibility check is performed to determine whether increased cell aging is present for one of the battery cells 21. This is performed by concluding that there is a cell voltage sensor fault if there is a discrepancy between the sum of the measured/corrected cell voltages and the measured terminal voltage (alternative: Yes), and continuing the procedure with step S4, while concluding that there is no discrepancy if it is determined (alternative: No) that there is increased aging of the corresponding battery cell 21 affecting its actual cell voltage, and continuing the procedure with step S10. Since a reduced cell voltage due to increased aging of the battery cell 21 also affects the terminal voltage, a corresponding battery cell fault can thus be clearly detected.

In step S10, the degradation or faulty device battery is signaled.

In step S4, the determined voltage offset for the cell voltage sensor detected as faulty is stored.

In step S5, a check is made to determine whether a predetermined minimum number of voltage offsets successively detected for a particular cell voltage sensor 31 detected as faulty has been reached. If this is not the case (alternative: No), the procedure continues with step S1. Otherwise (alternative: Yes), a sensor drift model is determined or specified in step S6.

The sensor drift model provided as a regression model can be data-based, e.g., in the form of a Gaussian process model or a Bayesian neural network, or parametric, e.g., in the form of a polynomial or spline function, in order to indicate a sensor drift in the form of a current voltage offset depending on a calendrical age of the cell voltage sensor.

Furthermore, features from load profiles, such as battery temperatures, voltage profiles and the like, can be taken into account when training the sensor drift model by comparing them with fleet vehicles in which the same sensor drift fault occurred previously and which exhibited the same load profile, so that the sensor drift of the current voltage sensor can be inferred from their sensor drift. This data is available as training data.

The sensor drift model now makes it possible to predict the sensor drift for different evaluation times (calendrical age) at each evaluation time and to correct the relevant cell voltage with the respective current voltage offset resulting from the sensor drift model for the further functions in the battery management system accordingly, in particular by additive or subtractive application of the measured cell voltage of the relevant battery cell.

Subsequently, the method continues with step S1 so that when another cell voltage sensor fault of a cell voltage sensor 31 of another battery cell 21 is determined, a corresponding fault correction of the previously determined faulty cell voltage sensors is taken into account. In this way, sensor drifts from cell voltage sensors 31 previously detected as faulty can be compensated for if it can be assumed that they do not occur simultaneously but with a time lag. Furthermore, signal drift models can be determined for each faulty cell voltage sensor and taken into account accordingly when correcting the measured cell voltage.

With the above procedure, it is possible to continue to operate a device battery 2 or a monitoring unit 3 even if multiple cell voltage sensors 31 exhibit significant sensor drifts without sacrificing accuracy or safety.

In particular, the method for creating the sensor drift model can be executed in a cloud, especially if this is data-based, e.g., in the form of a Gaussian process model. Further, the threshold at which a cell voltage sensor fault is detected can be variable and learned based on, for example, a plurality of battery systems to maximize the sensitivity of the method. For example, when commissioning battery systems with device batteries of the same type, the deviation threshold can be set relatively high, e.g., to 20 mV, to avoid false positive cases of a defective cell voltage sensor. As the battery systems operate, the deviation threshold can then be reduced based on operating time (based on calendrical age, or by number of cell voltage sensor errors detected), e.g., to 12 mV once the first confirmed cases of cell voltage sensor drift occur. Here, the threshold value can be designed in such a way that, for example, a defined false positive probability is not exceeded, such as $p<0.0003\%$.

In general, the occurred detected sensor drifts of faulty cell voltage sensors 31 can be signaled in a corresponding manner.

The invention claimed is:

1. A method for monitoring cell voltage sensors (31) of a battery system (1) comprising a device battery (2) having a plurality of battery cells (21), the method comprising:
   continuous monitoring of the device battery (2), via a voltage sensor, to detect, via a battery management system, a faulty cell voltage sensor (31) with a voltage offset above a predetermined threshold;
   upon detecting a faulty cell voltage sensor (31), detecting a plurality of voltage offsets at a plurality of evaluation time points;
   creation, via the battery management system, of a sensor drift model based on the multiple voltage offsets to determine or predict a voltage offset depending on the calendrical age of the device battery (2);
   wherein the voltage offset of a faulty cell voltage sensor (31) is detected by a deviation from a reference cell voltage, wherein the reference cell voltage is determined depending on the sensor drift model.

2. The method according to claim 1, wherein the reference cell voltage is determined as an average value of measured cell voltages of all or part of the battery cells (21), wherein the cell voltages detected by a faulty cell voltage sensor (31) are corrected by the voltage offset resulting from the sensor drift model for the current evaluation time, wherein the highest and lowest of the cell voltages are disregarded when forming the average value.

3. The method according to claim 1, wherein detecting a faulty cell voltage sensor (31) comprises verifying that a total voltage of the device battery (2) deviates from a sum of the measured cell voltages, by the voltage offset.

4. The method according to claim 3, wherein, if it is detected that the total voltage of the device battery (2) does not deviate from the sum of the measured cell voltages, a fault of one of the battery cells is concluded and signaled accordingly.

5. The method according to claim 1, wherein the method is continuously performed to detect a further faulty cell voltage sensor (31) after detecting a faulty cell voltage sensor (31), wherein detecting a further faulty cell voltage sensor (31) takes into account the voltage offset of the cell voltage sensor(s) (31) previously detected as faulty.

6. The method according to claim 1, wherein the sensor drift model is formed as a data-based model and is trained with the voltage offsets of the faulty cell voltage sensor (31), or wherein the sensor drift model is formed as a parametric regression model and is fitted with the voltage offsets of the faulty cell voltage sensor (31).

7. An apparatus for carrying out the method according to claim 1.

8. A computer program comprising instructions that, when the program is executed by at least one data processing device, prompt the latter to perform the method according to claim 1.

9. A non-transitory, computer-readable storage medium containing instructions which, when executed by at least one data processing device, prompt the latter to monitor cell voltage sensors (31) of a battery system (1) that includes a device battery (2) having a plurality of battery cells (21), by:
- continuously monitoring of the device battery (2), via a voltage sensor, to detect, via a battery management system, a faulty cell voltage sensor (31) with a voltage offset above a predetermined threshold;
- upon detecting a faulty cell voltage sensor (31), detecting a plurality of voltage offsets at a plurality of evaluation time points; and
- creating, via the battery management system, of a sensor drift model based on the multiple voltage offsets to determine or predict a voltage offset depending on the calendrical age of the device battery (2);
- wherein the voltage offset of a faulty cell voltage sensor (31) is detected by a deviation from a reference cell voltage, wherein the reference cell voltage is determined depending on the sensor drift model.

* * * * *